Patented Sept. 14, 1926.

1,599,413

UNITED STATES PATENT OFFICE.

HERBERT CHAMPION HARRISON, OF LOCKPORT, NEW YORK, AND CHARLES HOLMES HARRISON, OF ALGERS MANOR, GLOUCESTERSHIRE, ENGLAND.

PROCESS OF MAKING ARTIFICIAL STONE.

No Drawing. Application filed December 19, 1922. Serial No. 607,865.

This invention relates to artificial stone and a process of making the same, and has for its object to improve the prior procedures, as well as to produce products superior to those heretofore made.

With these and other objects in view, the invention consists in the novel stone constituting the product, and in the novel steps and combinations of steps constituting the process, all as will be more fully hereinafter disclosed and particularly pointed out in the claims.

In order that the precise invention may be more clearly understood, it is said: Prior to this invention, finely divided rock material has been mixed with lime, and the mixture has then been molded to the desired shape under pressure, dried, and subjected to the action of carbonic acid gas, $CO_2$, under increasing gas pressure. Such procedures may be found, for example, in the United States Patents Nos. 825,088, 927,822, 898,703, 963,337 and 995,268, each to T. M. Thom, and the products obtained from said procedures are well known in the art. But they do not insure the complete conversion of the lime into carbonate, and in consequence they produce stone which is inferior in hardness and durability to the stone made by the process now to be disclosed.

According to our invention, on the other hand, we may take finely divided stone preferably in the form of dust, mix it with a proportion of lime, say approximately 20% by weight of the stone material, with sufficient water to form a slurry, and press the mixture into the desired form.

A suitable pressure for such materials would be between, say, one and two tons to the square inch. The molded form, which may contain as much as, say, 15% by weight, of water, may be dried and a small quantity of water may be added as by quickly dipping the stone. This quantity of water will be found to be sufficient to insure a satisfactory carbonation when the stone is placed in a suitable container and exposed to the action of carbonic acid gas under an increasing pressure. The amount of water present in the stone constitutes an important feature of this invention, as will presently appear.

The gas pressure used can be varied in accordance with the time in which it is desired to complete carbonation; but satisfactory results can be obtained by raising the pressure from atmospheric to say 300 pounds to the square inch during a period of twenty-four hours.

The theory which is believed to govern the carbonation of the stone will be explained hereinafter, and the limits governing failure and success will be indicated, but a considerable latitude exists within which satisfactory results can be obtained.

For example, it has been found that the stone, if completely dried, without any additional water being introduced, will not carbonate at all. It is well ascertained that the stone as pressed, containing 15% of water, or somewhat less, is too wet, or the pores too much clogged, to allow of satisfactory carbonation.

It is also found that no carbonation will take place with wet or dry stone, if the temperature of the container and of the stone is in excess of the boiling point of water.

Within the limits thus mentioned, however, satisfactory carbonation can be effected, but when it is desired to effect quick results, great care must be taken when rapidly increasing pressures are used that the consequent temperature of the stone, due to chemical reaction within the mass, does not exceed the limiting temperature beyond which the reaction will not continue. This limiting temperature is believed to be the dissociation temperature of the acid bicarbonate present.

In carrying out our procedure, it is therefore important:

(1) That the dried stone be submitted to the action of the carbonic acid gas in the presence of a small proportion of water, which may be most conveniently added by dipping, or sprinkling the said stone with water upon the outside thereof;

(2) That the gas pressure shall be increased during the process of carbonation; and (3) That the heat generated by the conversion of the lime into carbonate shall be abstracted during the course of the reaction, to prevent the temperature of the mass from rising beyond a critical point.

The reason why it is important to observe these three conditions is believed to be as follows: When the mixture of rock dust and hydrated lime is exposed to the carbonic acid gas, some or all of the lime is ultimately converted into carbonate, in accordance with the following equation:

$$Ca(OH)_2 + CO_2 = CaCO_3 + H_2O$$

We have found it to be a fact, that if no moisture whatever is present, no chemical reaction takes place. If a very small amount of moisture is present, and the gas pressure remains constant, a slow reaction takes place, which comes to an end before the whole of the lime has been converted. If the mixture, on the other hand, is saturated with water, or contains more than a certain quantity of water, the reaction comes to an end before the lime is completely converted, whether the gas pressure is raised or not.

But we have also discovered that if the right amount of water is present, and the gas pressure is suitably raised during the course of the carbonation, the whole, or almost the whole, of the lime is converted into carbonate, forming a crypto-crystalline matrix, uniformly diffused over the whole mass, which thereby becomes hard and stony throughout.

While we do not wish to limit ourselves to any particular theory, yet we believe the course of the successful reaction is as follows: The carbonic acid gas, in the presence of water, forms aqueous carbonic acid:

$$CO_2 + H_2O = H_2CO_3$$

The aqueous carbonic acid, in the presence of an excess of carbonic acid gas, forms, with hydrated lime, an acid calcium bicarbonate in accordance with the following equation:

$$H_2CO_3 + Ca(OH)_2 + CO_2 = Ca(HCO_3)_2 + H_2O$$

This acid bicarbonate of calcium is unstable, and is decomposed into a carbonate with liberation of carbonic acid gas and water in accordance with the following equation:

$$Ca(HCO_3)_2 = CaCO_3 + CO_2 + H_2O$$

The completeness of the conversion of the lime into carbonate seems to depend upon progressively moistening each particle of lime present in the stony mass, and the ability to submit each moistened particle to carbonic acid gas at such a pressure that the acid bicarbonate can be formed.

From the foregoing, it will be clear that the water to initiate the chemical reaction may be provided as above intimated, either by drying the stone thoroughly, and then dipping it in water, or by spraying water on the stone, or by allowing steam to condense on it, or said stone may be wetted in any other suitable way. When once the chemical action has started, the water necessary to carry it on is provided from the lime itself, as is clear from the above equations. That is, each molecule of lime upon conversion into said bicarbonate, surrenders a molecule of water of hydration, and the molecule of water so set free immediately becomes available to carry on the reaction in the presence of an excess of carbonic acid gas. When the whole of the lime has thus been converted into carbonate, the whole of the water of hydration has been liberated. The preferred method of procedure is to dry the mass after shaping it and to then dip the same into water, so that there will be a higher concentration of water on the outer surfaces than on the interior of the stone, for it is found that the reaction then proceeds without difficulty from said outer surfaces throughout the interior of the mass.

In other words, as above stated, the reaction tends to cause a continuous accumulation of water within the interstices of the stone, and therefore, if this water is added to an excess of water already on the interior of the mass the process of making the stone may be brought prematurely to an end.

Although, as further stated above, we do not limit ourselves to this theory of chemical action, yet it explains satisfactorily why the procedures we have outlined cause the process of converting lime into the carbonate form to be unusually quick and certain. That is, the wetting of the stone to a limited degree insures a vigorous chemical reaction on the outside the moment the material is brought into contact with the carbonic acid gas. This vigorous reaction is accompanied by a rapid rise in temperature, which, as is well known, in accordance with general physical laws, tends to oppose the reaction. On the other hand, this said rise in temperature performs a more or less beneficial function, in that it helps to expel any excess of water from the stone that may be present. But the effect of such a rise in temperature, namely, the retardation of the chemical reaction by checking the formation of the acid bicarbonate, may be counteracted by increasing the gas pressure, for as is further well known, there exists a particular dissociation pressure for each temperature, below which pressure the acid bicarbonate cannot exist, and for any given pressure there exists a particular dissociation temperature, above which temperature said acid bicarbonate cannot exist. But on the other hand, if the gas pressure is raised too much, or too suddenly, the stone may become so hot that it cracks, due to an intensified chemical action. To guard against this, it is advantageous to employ some means of cooling this stone, so that the surplus heat generated may be dissipated. In other words, the rise in temperature must be kept under careful control, and the temperature must not be so high that it prevents the formation of the acid bicarbonate. Still less must the temperature be allowed to crack the stone.

The necessary control of the manufacture of artificial stone according to this invention, is thus had by the procedures above outlined, involving the proper wetting of the stone, the increasing of the gas pressure, and the cooling of the stone in any suitable manner, as by the use of a water jacket, for example, when the reaction goes too fast. By adopting these methods of control, the conversion of the lime into calcium carbonate may be effected in a shorter time, and with much greater certainty and efficiency, than by any other method heretofore disclosed, in so far as we are aware.

The stone produced by this invention is far superior to prior products, and may be readily distinguished therefrom with the aid of chemical tests, due to the fact that substantially all of the lime present has been converted into stone, so that the latter is harder and more uniform in character than are the said prior products.

Where the words "stone material", or words of similar import, are employed, it is not intended to exclude the use of any suitable aggregate capable of being bound by the carbonation of lime. In all of the procedures described, the lime, of course, may be a calcium or a magnesium lime, and it is preferred that the mixture of aggregate and lime be first dried completely and then moistened, all as hereinbefore stated.

It is obvious that those skilled in the art may vary the details of the process, without departing from the spirit of the invention, and therefore it is not desired to be limited to the above disclosures except as may be required by the claims.

What is claimed is:

1. The process of making an artificial stone which consists in mixing stone material with water and lime; drying the mass thus produced; wetting with water the dried mass; subjecting the wetted material to the action of carbonic acid gas; and increasing the pressure of said gas during the period of carbonation.

2. The process of making an artificial stone which consists in mixing stone material with water and lime; drying the mass thus produced; wetting with water the dried mass; subjecting the wet mass to a partial vacuum; subjecting the wetted material to carbonic acid gas; and increasing the pressure of said gas during the period of carbonation.

3. The process of making an artificial stone which consists in mixing stone material with water and lime; drying the mass thus produced; wetting with water the dried mass; subjecting the wetted material to the action of carbonic acid gas; increasing the pressure of said gas during the period of carbonation; and abstracting a portion of the heat evolved during said period.

4. The process of making an artificial stone which consists in mixing stone material with water and lime; forming the mass thus produced in the desired shape under pressure; drying the formed mass; moistening the dried mass; and subjecting the moistened mass to the action of carbonic acid gas; and increasing the pressure of said gas during the period of carbonation.

5. The process of making an artificial stone which consists in mixing stone material with water and lime; forming the mass into the desired shape under pressure; drying the formed mass; moistening the dried mass; submitting the mass to the action of carbonic acid gas.

6. The process of making an artificial stone which consists in mixing stone material with water and lime; forming the mass thus produced in the desired shape under pressure; drying the formed mass; moistening the dried mass; subjecting the wet mass to a partial vacuum; subjecting the moistened mass to the action of carbonic acid gas; and increasing the pressure of said gas during the period of carbonation.

7. The process of making an artificial stone which consists in mixing stone material with water and lime; forming the mass thus produced in the desired shape under pressure; drying the formed mass; moistening the dried mass; subjecting the moistened mass to the action of carbonic acid gas under an increasing pressure; and abstracting a portion of the heat evolved during the period of carbonation.

8. The process of making an artificial stone which consists in mixing stone material with water and lime; forming the mass thus produced in the desired shape under pressure; drying the formed mass; moistening the dried mass; submitting the mass to the action of carbonic acid gas; and abstracting a portion of the heat evolved during the period of carbonation.

9. The process of making an artificial stone which consists in preparing with water a mass of finely divided stone material containing lime; drying the mass; moistening the outside of the dried mass only; and subjecting the moistened surfaces to the action of carbonic acid gas.

10. The process of making an artificial stone which consists in preparing with water a mass of finely divided stone material containing lime; removing water from said mass; adding water to the outside surface only of said mass; and subjecting the wetted surfaces to an increasing pressure of carbonic acid gas.

11. The process of making an artificial stone which consists in preparing with water a mass of finely divided stone material containing lime; removing water from said mass; adding water to the outside surface only of said mass as by dipping said mass; and subjecting the wetted surfaces to an increasing pressure of carbonic acid gas.

12. The process of making an artificial stone which consists in preparing with water a mass of finely divided stone material containing lime; removing water from the mass; adding water to the outside surface only of said mass; and subjecting the wetted surfaces to an increasing pressure of carbonic acid gas; and maintaining the temperature of said mass below 212° F.

13. The process of making an artificial stone which consists in preparing with water a mass of finely divided stone material containing lime; removing water from said mass; adding water to the outside surface only of said mass; subjecting the wetted surfaces to an increasing pressure of carbonic acid gas; and withdrawing heat from the mass during the reaction.

14. The process of making an artificial stone which consists in preparing a mass of finely divided stone material containing lime and water; drying said mass after it has been molded; superficially wetting with water the dried mass; subjecting said wetted mass to the action of carbonic acid gas to carbonate the same; and increasing the pressure of said gas during the period of carbonation.

15. The process of making an artificial stone which consists in preparing a mass of finely divided stone material containing lime and a predetermined limited quantity of water; drying said mass after it has been molded; superficially wetting with water the dried mass; subjecting said wetted mass to the action of carbonic acid gas to carbonate the same; and increasing the pressure of said gas during the period of carbonation.

16. The process of making an artificial stone which consists in preparing a mass of finely divided stone material containing lime and a predetermined limited quantity of water; completely drying said mass after it has been molded; superficially wetting with water the dried mass; subjecting said wetted mass to the action of carbonic acid gas to carbonate the same; and increasing the pressure of said gas during the period of carbonation.

17. The process of making an artificial stone which consists in preparing a mass of finely divided stone material containing lime and water; drying said mass after it has been molded; superficially wetting with water the dried mass; subjecting said wetted mass to the action of carbonic acid gas to carbonate the same; and increasing the pressure of said gas while controlling the temperature of said mass during the period of carbonation.

18. The process of making an artificial stone which consists in preparing a mass of finely divided stone material containing lime and a predetermined limited quantity of water; completely drying said mass after it has been molded; superficially wetting only with water the dried mass; subjecting said wetted mass to the action of carbonic acid gas to carbonate the same; and increasing the pressure of said gas during the period of carbonation.

In testimony whereof we affix our signatures.

HERBERT CHAMPION HARRISON.
CHARLES HOLMES HARRISON.